(12) United States Patent
Eisenberg et al.

(10) Patent No.: US 9,777,098 B2
(45) Date of Patent: Oct. 3, 2017

(54) POLYALKYL(METH)ACRYLATE FOR IMPROVING LUBRICATING OIL PROPERTIES

(75) Inventors: Boris Eisenberg, Heppenheim (DE); Dieter Janssen, Gross-Umstadt (DE); Ellen Suchert, Bensheim (DE); Miriam Kathrin Stihulka, Maintal (DE); Lucas Voigt, Weiterstadt (DE)

(73) Assignee: Evonik Oil Additives GmbH, Darmstadt (DE)

(*) Notice: Subject to any disclaimer, the term of this patent is extended or adjusted under 35 U.S.C. 154(b) by 395 days.

(21) Appl. No.: 13/702,317

(22) PCT Filed: Jun. 27, 2011

(86) PCT No.: PCT/EP2011/060670
§ 371 (c)(1),
(2), (4) Date: Dec. 6, 2012

(87) PCT Pub. No.: WO2012/013432
PCT Pub. Date: Feb. 2, 2012

(65) Prior Publication Data
US 2013/0079265 A1    Mar. 28, 2013

(30) Foreign Application Priority Data
Jul. 29, 2010    (DE) .................. 10 2010 038 615

(51) Int. Cl.
*C08F 261/00*    (2006.01)
*C08F 120/08*    (2006.01)
(Continued)

(52) U.S. Cl.
CPC .......... *C08F 261/00* (2013.01); *C08F 120/18* (2013.01); *C10M 149/00* (2013.01);
(Continued)

(58) Field of Classification Search
CPC .... C08F 261/00; C08F 120/18; C10M 149/00
(Continued)

(56) References Cited

U.S. PATENT DOCUMENTS 4,668,412 A    5/1987    Hart et al.
5,858,524 A    1/1999    Bafford
(Continued)

FOREIGN PATENT DOCUMENTS

CN    1486997    4/2004
DE    43 30 971    3/1995
(Continued)

OTHER PUBLICATIONS

Ni, S. et al., "Chemical and Physical Adsorption of Polymers Containing Thiophosphate, Amino, or Polysiloxane Groups at the Oil/Metal Interface under Extreme Pressure," Journal of Polymer Science: Part A: Polymer Chemistry, vol. 41, pp. 106 to 115, (2003) XP-002656508.
(Continued)

*Primary Examiner* — Ling Choi
*Assistant Examiner* — Thuy-Ai N Nguyen
(74) *Attorney, Agent, or Firm* — Oblon, McClelland, Maier & Neustadt, L.L.P.

(57) ABSTRACT

The invention relates to a polyalkyl (meth) acrylate for improving lubricating oil properties, which comprises repetition units which are derived from (meth) acrylates having 6 to 22 carbon atoms in the alcohol residues, and repetition units which are derived from amine derivatives of an ethylenically unsaturated monomer. The invention further relates to methods for producing and using the present polyalkyl (meth) acrylate.

12 Claims, 1 Drawing Sheet

(51) Int. Cl.
*C10M 149/00* (2006.01)
*C10M 149/02* (2006.01)
*C08F 120/18* (2006.01)
*C10M 149/04* (2006.01)
*C10M 149/06* (2006.01)
*C10M 149/10* (2006.01)

(52) U.S. Cl.
CPC ........ *C10M 149/02* (2013.01); *C10M 149/04* (2013.01); *C10M 149/06* (2013.01); *C10M 149/10* (2013.01); *C10M 2203/1025* (2013.01); *C10M 2209/084* (2013.01); *C10M 2215/28* (2013.01); *C10M 2217/023* (2013.01); *C10M 2217/024* (2013.01); *C10M 2217/028* (2013.01); *C10M 2217/06* (2013.01); *C10N 2230/02* (2013.01); *C10N 2230/04* (2013.01); *C10N 2230/06* (2013.01); *C10N 2230/14* (2013.01)

(58) Field of Classification Search
USPC .......................................................... 526/307
See application file for complete search history.

(56) References Cited

U.S. PATENT DOCUMENTS

| | | | |
|---|---|---|---|
| 5,942,471 | A | 8/1999 | Kapuscinski et al. |
| 6,025,308 | A | 2/2000 | Matsuya et al. |
| 6,284,716 | B1 | 9/2001 | Gunther et al. |
| 8,101,559 | B2 | 1/2012 | Mueller et al. |
| 8,288,327 | B2 | 10/2012 | Dardin et al. |
| 2004/0254080 | A1 | 12/2004 | Sivik et al. |
| 2006/0142168 | A1 | 6/2006 | Kinker et al. |
| 2006/0189490 | A1 | 8/2006 | Dardin et al. |
| 2008/0026964 | A1 | 1/2008 | Srinivasan et al. |
| 2008/0033114 | A1 | 2/2008 | Srinivasan et al. |
| 2008/0051520 | A1 | 2/2008 | Srinivasan et al. |
| 2008/0146475 | A1 | 6/2008 | Mueller et al. |
| 2008/0293600 | A1* | 11/2008 | Goldblatt .................. C08F 8/32 508/221 |
| 2009/0270287 | A1 | 10/2009 | Kinker et al. |
| 2011/0237473 | A1 | 9/2011 | Stoehr et al. |
| 2012/0046207 | A1 | 2/2012 | Müller et al. |

FOREIGN PATENT DOCUMENTS

| | | |
|---|---|---|
| DE | 10 2007 031 247 | 2/2008 |
| EP | 0 841 157 | 5/1998 |
| GB | 982 077 | 2/1965 |
| JP | 2000-87063 A | 3/2000 |
| JP | 2008-31477 A | 2/2008 |
| RU | 2 113 444 C1 | 6/1998 |
| SU | 294345 A3 | 1/1971 |
| WO | WO 2004/087850 A1 | 10/2004 |
| WO | 2006 066649 | 6/2006 |
| WO | WO 2006/105926 A1 | 10/2006 |
| WO | WO 2007/070845 A2 | 6/2007 |
| WO | WO 2009/019065 A2 | 2/2009 |

OTHER PUBLICATIONS

International Search Report Issued Aug. 22, 2011 in PCT/EP11/60670 Filed Jun. 27, 2011.
Office Action issued Jul. 29, 2015 in Russian Patent Application No. 2013108705/04(01893) (submitting English translation only).
Office Action dated Jan. 26, 2015 in Japanese Application No. 2013-521032 (submitting English translation only).

* cited by examiner

POLYALKYL(METH)ACRYLATE FOR IMPROVING LUBRICATING OIL PROPERTIES

The present invention relates to polyalkyl(meth)acrylates for improvement of lubricant oil properties. The present invention additionally describes processes for preparation of and use of these polyalkyl(meth)acrylates.

The efficiency of modern gearboxes, engines or hydraulic pumps depends not only on the characteristics of the machine parts but also greatly on the frictional properties of the lubricant used. For the development of such lubricants, it is of particular importance to have knowledge about the action of the lubricant components used in relation to film formation and friction, and the choice of suitable additives may have the effect, for example, of lowering the average fuel consumption of a vehicle by a few percent. In this context, particularly effective constituents of a lubricant may be base oils with particularly low viscosity and hence low inherent friction, and also organic friction modifiers. One example of this trend is the newest generation of what are called fuel-economy engine oils of SAE classes 5W-20, SAE 5W-30 or SAE 0W-20, which can also be found in analogously for oils for manual and automatic gearboxes.

As a result of a development parallel to that of the fuel-saving lubricants, the use of friction-modifying additives has become even more important: the dimensions of modern gearbox and pump housings are much smaller, they are cooled less efficiently, and both gearwheels and bearings have to bear higher loads.

Recently described as additives for improving the coefficient of friction have been copolymers based on (meth)acrylates having a block structure. For instance, more particularly, publications WO 2004087850 A1, WO 2006105926 A1 and WO 2009019065 A2 describe polymers having at least one polar and at least one nonpolar segment, which lead to an enhancement of the lubricant oil properties. A disadvantage of these polymers, however, is the relatively high level of complexity necessary for preparation of these additives.

In addition, there are known polymers which lead to dispersion of the soot particles in the lubricant oil, and these may comprise, among other monomer units, those derived from amine derivatives of maleic acid. Such polymers are described, inter alia, in DE 102007031247 A1, WO 2007/070845 A2, US 2004/0254080 A1 and U.S. Pat. No. 5,942,471.

Publication DE 102007031247 A1 describes polyalkyl(meth)acrylate (PAMA) copolymers containing maleic anhydride (MA), in which the MA groups are reacted with amines, especially with N-phenyl-1,4-phenylenediamine (DPA). In this document, more particularly, the use of the polymers as a dispersant for dispersion of soot is described. No improvement of the friction properties of these polymers is described. The composition of the polymers is restricted to pure methacrylate and acrylate copolymers containing MA.

Document WO 2007/070845 A2 describes reaction products with amines based on MA-containing PAMAs. The polymers described in WO 2007/070845 A2 are used in combination with a dispersant in a base oil, and the resulting lubricant leads particularly to lowering of the fuel consumption (fuel economy) in a defined test bed engine test.

US 2004/0254080 A1 describes MA-containing PAMA copolymers, some of which are reacted with amines. No improved effect with regard to coefficient of friction, dispersancy or wear characteristics is mentioned.

U.S. Pat. No. 5,942,471 describes OCP VI improvers which are grafted with MA and then reacted with amines, including DPA. There is no mention of alternative chemistries such as epoxide groups for introduction of the amine. Also described are the antioxidant effect of the polymers, a reduced rise in viscosity on introduction of soot into the oil, and improved wear characteristics in the case of soot-containing oils as a result of improved soot dispersion.

The polymers described above already lead to a useable profile of properties in a lubricant. However, there is a constant need to improve this profile of properties.

In view of the prior art, it is thus an object of the present invention to provide an additive and a lubricant with an improved profile of properties.

In particular need of improvement is the coefficient of friction of the lubricants. At the same time, the additive was to have increased compatibility with conventional additives, especially PIB succinimides, such that the coefficient of friction is not excessively impaired even when these additives are added. In addition, the additive was to lead to an enhancement of dispersancy, particularly of soot dispersion.

Moreover, the lubricant was to have an enhanced viscosity index, without any unacceptable impairment of other properties as a result.

Furthermore, a reduction in the formation of gray staining (surface fatigue, micro-pitting) and craters (sub-surface fatigue, pitting) was particularly to be achieved.

It was a further object of the invention to provide additives which can be produced in a simple and inexpensive manner, and it was a particular intention to use commercially available components. At the same time, production was to be possible on the industrial scale without any requirement for new plants or plants of complex construction for this purpose.

In addition, it was an aim of the present invention to provide an additive which brings about a multitude of desirable properties in the lubricant. This can minimize the number of different additives.

Furthermore, the additive was to lead to an improvement in fuel consumption, without any resulting impairment in the environmental compatibility of the lubricant.

These objects, and further objects which are not stated explicitly but are immediately derivable or discernible from the connections discussed herein by way of introduction, are achieved by a polyalkyl(meth)acrylate for improvement of lubricant oil properties having all features of claim 1. Appropriate modifications of the inventive polyalkyl(meth)acrylate are protected in the dependent claims referring back to claim 1.

The present invention accordingly provides a polyalkyl(meth)acrylate for improvement of lubricant oil properties, comprising repeat units derived from (meth)acrylates having 6 to 22 carbon atoms in the alcohol radical, characterized in that the polyalkyl(meth)acrylate comprises repeat units derived from amine derivatives of a polar ethylenically unsaturated monomer.

It is thus possible in an unforeseeable manner to provide a polyalkyl(meth)acrylate and a lubricant with an improved profile of properties.

For instance, a lubricant comprising the inventive polyalkyl(meth)acrylates exhibits an improved coefficient of friction. At the same time, the additive has increased compatibility with conventional additives, especially PIB succinimides, such that the coefficient of friction is not excessively impaired even when these additives are added. In addition, the additive leads to an enhancement of dispersancy, particularly of soot dispersion.

Moreover, the lubricant has an enhanced viscosity index, without any resultant unacceptable impairment of other properties. Relatively small amounts of the present additives, which have a high thickening action, are adequate for a significant rise in the viscosity index.

Furthermore, a reduction in the formation of gray staining (surface fatigue, micro-pitting) or craters (sub-surface fatigue, pitting) can be achieved. A distinction is typically drawn between two groups of faults at metallic surfaces of gearboxes, especially at gearings and roller bearings:
1. wear resulting from continuous surface material removal or scuffing as a result of abrupt material removal after surface wear of both friction partners.
2. fatigue which becomes visible through gray staining (surface fatigue, micro-pitting) or craters (sub-surface fatigue, pitting). This damage is caused by material flaking off or breaking out due to cracks which are caused by shear stresses in the metal lattice 20-40 μm or 100-500 μm below the surface.

The types of damage mentioned are commonly known for gearings and roller bearings, and are described in detail, for example, in the publications "Gears—Wear and Damage to Gear Teeth", ISO DIN 10825 and "Wälzlagerschäden" [Damage to Roller Bearings], Publ. No. WL 82 102/2 DA from FAG (Schaeffler KG), Schweinfurt 2004.

In addition, the present invention provides additives which can be produced in a simple and inexpensive manner, more particularly using commercially available components. At the same time, production is possible on the industrial scale without any requirement for new plants or plants of complex construction for this purpose.

In addition, the inventive additives can bring about a multitude of desirable properties in the lubricant. This can minimize the number of different additives.

Furthermore, the additive can lead to an improvement in fuel consumption, without any associated adverse effects on environmental compatibility.

Furthermore, the inventive polyalkyl(meth)acrylates exhibit excellent thickening action and high shear stability. Furthermore, relatively small amounts of the present polyalkyl(meth)acrylates increase the viscosity index of different lubricant oils.

The inventive polymer is based on (meth)acrylates. Polyalkyl(meth)acrylates are polymers by which polymerization of alkyl(meth)acrylates can be obtained. The expression "(meth)acrylates" encompasses methacrylates and acrylates and mixtures of the two. These monomers are widely known.

Polyalkyl(meth)acrylates comprise preferably at least 40% by weight, more preferably at least 60% by weight, especially preferably at least 80% by weight and most preferably at least 90% by weight of repeat units derived from (meth)acrylates, preferably alkyl(meth)acrylates.

Preferred polyalkyl(meth)acrylates comprise
a) 0 to 40% by weight, especially 1 to 25% by weight and more preferably 2 to 15% by weight of repeat units derived from (meth)acrylates of the formula (I)

in which R is hydrogen or methyl and $R^1$ is an alkyl radical having 1 to 5 carbon atoms,
b) 20 to 99.9% by weight, preferably 50 to 99.9% by weight, especially at least 70% by weight and more preferably at least 80% by weight of repeat units derived from (meth)acrylates of the formula (II)

in which R is hydrogen or methyl and $R^2$ is an alkyl radical having 6 to 22 carbon atoms,
c) 0 to 20% by weight, preferably 0.1 to 15% by weight, preferably 0.5 to 20% by weight and more preferably 1 to 10% by weight of repeat units derived from (meth)acrylates of the formula (III)

in which R is hydrogen or methyl and $R^3$ is an alkyl radical having 23 to 4000 and preferably 23 to 400 carbon atoms, and
d) 0.1 to 10% by weight, preferably 1 to 8% by weight and more preferably 2 to 5% by weight of repeat units derived from amine derivatives of a polar ethylenically unsaturated monomer.

The polyalkyl(meth)acrylates can preferably be obtained by free-radical polymerization. Accordingly, the proportion by weight of the respective repeat units that these polymers contain results from the proportions by weight of corresponding monomers used to prepare the polymers.

Examples of (meth)acrylates of the formula (I) include linear and branched (meth)acrylates which derive from saturated alcohols, such as methyl (meth)acrylate, ethyl (meth)acrylate, n-propyl (meth)acrylate, isopropyl (meth)acrylate, n-butyl (meth)acrylate, tert-butyl (meth)acrylate and pentyl (meth)acrylate; and cycloalkyl (meth)acrylates such as cyclopentyl (meth)acrylate.

The (meth)acrylates of the formula (II) include especially linear and branched (meth)acrylates which derive from saturated alcohols, such as hexyl (meth)acrylate, 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, 2-methylpentadecyl (meth)acrylate, 2-ethyltetradecyl (meth)acrylate, 2-propyltridecyl (meth)acrylate, 2-butyldodecyl (meth)acrylate, 2-methylhexadecyl (meth)acrylate, 2-pentyldodecyl (meth)acrylate, 2-hexyldecyl (meth)acrylate, 2-hexylundecyl (meth)acrylate, n-heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, docosyl (meth)acrylate;
(meth)acrylates which derive from unsaturated alcohols, for example oleyl (meth)acrylate;
cycloalkyl (meth)acrylates such as cyclohexyl (meth)acrylate, 3-vinylcyclohexyl (meth)acrylate, bornyl (meth)acrylate, 2,4,5-tri-t-butyl-3-vinylcyclohexyl (meth)acrylate, 2,3,4,5-tetra-t-butylcyclohexyl (meth)acrylate.

Examples of monomers of the formula (III) include linear and branched (meth)acrylates which derive from saturated alcohols, such as cetyleicosyl (meth)acrylate, stearyleicosyl (meth)acrylate and/or eicosyltetratriacontyl (meth)acrylate; cycloalkyl (meth)acrylates such as 2,3,4,5-tetra-t-hexylcyclohexyl (meth)acrylate.

In a particular configuration of the present invention, the monomers of the formula (III) include what are called polyolefin-based macromonomers with (meth)acrylate groups, which are described inter alia in DE 10 2007 032 120 A1, filed Jul. 9, 2007 at the German Patent Office with application number DE102007032120.3; and DE 10 2007 046 223 A1, filed Sep. 26, 2007 at the German Patent Office with application number DE 102007046223.0; the disclosures of these publications, more particularly the (meth)acrylates having at least 23 carbon atoms in the radical described therein, are incorporated into the present application by reference for the purposes of disclosure.

Polyolefin-based macromonomers are known in the specialist field. These repeat units include at least one group derived from polyolefins. Polyolefins are known in the specialist field, these being obtainable by polymerization of alkenes and/or alkadienes consisting of the elements carbon and hydrogen, for example $C_2$-$C_{10}$-alkenes such as ethylene, propylene, n-butene, isobutene, norbornene, and/or $C_4$-$C_{10}$-alkadienes such as butadiene, isoprene, norbornadiene. The repeat units derived from polyolefin-based macromonomers comprise preferably at least 70% by weight and more preferably at least 80% by weight and most preferably at least 90% by weight of groups derived from alkenes and/or alkadienes, based on the weight of the repeat units derived from polyolefin-based macromonomers. In this case, the polyolefinic groups may especially also be present in hydrogenated form. As well as the groups derived from alkenes and/or alkadienes, the repeat units derived from polyolefin-based macromonomers may comprise further groups. These include small proportions of copolymerizable monomers. These monomers are known per se and include alkyl (meth)acrylates, styrene monomers, fumarates, maleates, vinyl esters and/or vinyl ethers. The proportion of these groups based on copolymerizable monomers is preferably at most 30% by weight, more preferably at most 15% by weight, based on the weight of the repeat units derived from polyolefin-based macromonomers. In addition, the repeat units derived from polyolefin-based macromonomers may include starting groups and/or end groups which serve for functionalization or result from the preparation of the repeat units derived from polyolefin-based macromonomers. The proportion of these starting groups and/or end groups is preferably at most 30% by weight, more preferably at most 15% by weight, based on the weight of the repeat units derived from polyolefin-based macromonomers.

The number-average molecular weight of the repeat units derived from polyolefin-based macromonomers is preferably in the range from 500 to 50 000 g/mol, more preferably 700 to 10 000 g/mol, especially 1500 to 4900 g/mol and most preferably 2000 to 3000 g/mol.

In the case of preparation of the comb polymers by copolymerization of low molecular weight and macromolecular monomers, these values result from the properties of the macromolecular monomers. In the case of polymer-analogous reactions, this property arises, for example, from the macroalcohols and/or macroamines used, taking account of the converted repeat units in the main chain. In the case of graft copolymerizations, the molecular weight distribution of the polyolefin can be concluded via the proportion of polyolefins formed which has not been incorporated into the main chain.

The repeat units derived from polyolefin-based macromonomers preferably have a low melting temperature, this being measured by means of DSC. The melting temperature of the repeat units derived from the polyolefin-based macromonomers is preferably less than or equal to −10° C., especially preferably less than or equal to −20° C., more preferably less than or equal to −40° C. Most preferably, no melting temperature can be measured by DSC for the repeat units derived from the polyolefin-based macromonomers.

In addition, the monomers of the formula (III) include especially long-chain branched (meth)acrylates, which are described, inter alia, in U.S. Pat. No. 6,746,993, filed Aug. 7, 2002 at the U.S. Patent Office (USPTO) with application Ser. No. 10/212,784; and US 2004/077509, filed Aug. 1, 2003 at the U.S. Patent Office (USPTO) with application Ser. No. 10/632,108; the disclosures of these publications, especially the (meth)acrylates having at least 23 carbon atoms in the radical described therein, are incorporated into the present application by reference for the purposes of disclosure.

Alkyl (meth)acrylates with a long-chain alcohol radical, especially components (II) and (III), can be obtained, for example, by reaction of (meth)acrylates and/or the corresponding acids with long-chain fatty alcohols, which generally gives rise to a mixture of esters, for example (meth)acrylates with various long-chain alcohol radicals. These fatty alcohols include Oxo Alcohol® 7911, Oxo Alcohol® 7900, Oxo Alcohol® 1100; Alfol® 610, Alfol® 810, Lial® 125 and Nafol® products (Sasol); C13-C15-Alkohol (BASF); Epal® 610 and Epal® 810 (Afton); Linevol® 79, Linevol® 911 and Neodol® 25 (Shell); Dehydad®, Hydrenol® and Lorol® products (Cognis); Acropol® 35 and Exxal® 10 (Exxon Chemicals); Kalcol® 2465 (Kao Chemicals).

The polyalkyl(meth)acrylate includes repeat units derived from amine derivatives of a polar ethylenically unsaturated monomer. The expression "polar ethylenically unsaturated monomer" makes it clear that the monomer can be free-radically polymerized. In addition, the term "polar" expresses the fact that the monomer is particularly polar even after the reaction with an amine, for example to give a higher-order amine (from primary to secondary or from secondary to tertiary), an amide or an imide in the environment of the reaction site. The groups included here include especially imide groups or carboxylic acid groups formed, which are formed, for example, in the reaction of acid anhydrides with amines, or hydroxyl groups, which are obtained in the reaction of epoxides. Carboxylic acid groups may be present here in the form of the free acid or as the salt.

Accordingly, further polar groups, for example carbonyl groups, acid groups or hydroxyl groups, are present in the environment of the amide group of the amine derivative (in the case of reaction with an anhydride) or of the amine group of the amine derivative (in the case of reaction with an epoxide). Preferably, the amide group of the amine derivative is accordingly an imide group. The term "environment of the reaction site" indicates that the polar groups which form are at most 6 and preferably at most 5 covalent bonds removed from the amine or amide group obtained, based on the distance between oxygen atom and nitrogen atom.

In one embodiment of the present invention, the polar ethylenically unsaturated monomer from which the amine derivative is derived may be maleic acid or a maleic acid derivative, for example maleic monoester, maleic diester, maleic anhydride, methyl maleic anhydride, particular preference being given to maleic anhydride.

In a further aspect of the present invention, the polar ethylenically unsaturated monomer from which the amine derivative is derived may be a (meth)acrylate having an epoxide group, particular preference being given to glycidyl (meth)acrylate.

The radical of the amine derivative of a polar ethylenically unsaturated monomer, said radical being formed from the amine, may preferably be derived from a primary amine which typically corresponds to the general formula $R^4$—$NH_2$ in which $R^4$ is a radical having 2 to 40 carbon atoms, preferably 3 to 30 and more preferably 4 to 20 carbon atoms, which may include heteroatoms.

The expression "group having 2 to 40 carbon atoms" indicates radicals of organic compounds having 2 to 40 carbon atoms. It includes not only aromatic and heteroaromatic groups but also aliphatic and heteroaliphatic groups, for example alkyl, cycloalkyl, alkoxy, cycloalkoxy, cycloalkylthio and alkenyl groups. The groups mentioned may be branched or unbranched.

According to the invention, aromatic groups refer to radicals of mono- or polycyclic aromatic compounds having preferably 6 to 20 and especially 6 to 12 carbon atoms, for example phenyl, naphthyl or biphenylyl, preferably phenyl.

Heteroaromatic groups denote aryl radicals in which at least one CH group has been replaced by N and/or at least two adjacent CH groups have been replaced by S, NH or O. These radicals include groups derived from thiophene, furan, pyrrole, thiazole, oxazole, imidazole, isothiazole, isoxazole, pyrazole, 1,3,4-oxadiazole, 1,3,4-thiadiazole, 1,3,4-triazole, 1,2,4-oxadiazole, 1,2,4-thiadiazole, 1,2,4-triazole, 1,2,3-triazole,
1,2,3,4-tetrazole, benzo[b]thiophene, benzo[b]furan, indole, benzo[c]thiophene,
benzo[c]furan, isoindole, benzoxazole, benzothiazole, benzimidazole, benzisoxazole,
benzisothiazole, benzopyrazole, benzothiadiazole, benzotriazole, dibenzofuran,
dibenzothiophene, carbazole, pyridine, pyrazine, pyrimidine, pyridazine, 1,3,5-triazine,
1,2,4-triazine, 1,2,4,5-triazine, quinoline, isoquinoline, quinoxaline, quinazoline,
cinnoline, 1,8-naphthyridine, 1,5-naphthyridine, 1,6-naphthyridine,
1,7-naphthyridine, phthalazine, pyridopyrimidine, purine, pteridine or 4H-quinolizine.

The preferred alkyl groups include the methyl, ethyl, propyl, isopropyl, 1-butyl, 2-butyl, 2-methylpropyl, tert-butyl, pentyl, 2-methylbutyl, 1,1-dimethylpropyl, hexyl, heptyl, octyl, 1,1,3,3-tetramethylbutyl, nonyl, 1-decyl, 2-decyl, undecyl, dodecyl, pentadecyl and the eicosyl group.

The preferred cycloalkyl groups include the cyclopropyl, cyclobutyl, cyclopentyl, cyclohexyl, cycloheptyl and cyclooctyl group, which are optionally substituted by branched or unbranched alkyl groups.

The preferred alkenyl groups include the vinyl, allyl, 2-methyl-2-propene, 2-butenyl, 2-pentenyl, 2-decenyl and 2-eicosenyl group.

The $R^4$ radical may have substituents. The preferred substituents include halogens, especially fluorine, chlorine, bromine, and alkoxy groups.

The reactant for derivatization of the polar ethylenically unsaturated monomers mentioned comprises at least two nitrogen atoms, preferably at least two amino groups. In a particular aspect, the number of nitrogen atoms in the reactant for of the polar ethylenically unsaturated monomers mentioned may be 2 to 6 and more preferably 2 to 4 nitrogen atoms, preferably amino groups. The term "amino group" should be understood here in a broad sense, such that aromatic compounds having a nitrogen atom, for example pyridine, also count as one of the amines. Preferably, the reactant for derivatization of the polar ethylenically unsaturated monomers mentioned comprises at least one primary or secondary amino group, particular preference being given to primary amino groups. Preferred amines from which the amine derivative of a polar ethylenically unsaturated monomer may be derived comprise preferably at least two amino groups, one amino group being a primary amino group and at least one amino group being a secondary amino group.

These amines preferably correspond to the formula $R^5$—NH—$R^6$—$NH_2$ in which $R^5$ is a radical having 1 to 18 and preferably 1 to 10 carbon atoms, and $R^6$ is a radical having 2 to 18 and preferably 2 to 10 carbon atoms.

The particularly preferred amines, from which the derivatives of the polar ethylenically unsaturated monomers mentioned may be derived, include especially N-phenyl-1,4-phenylenediamine (DPA), N,N-dimethylaminopropylamine (DMAPA), N,N-dimethylaminoethylamine, diethylaminopropyl-amine, dibutylaminopropylamine, dimethylaminoethylamine, diethylaminoethylamine, dibutylaminoethylamine, 1-(2-aminoethyl)piperidine, 1-(2-aminoethyl)pyrrolidone, 4-(3-aminopropyl)morpholine, aminoethylmorpholine, for example 4-(3-aminoethyl)morpholine, N-(2-aminoethyl)-1,3-propanediamine, 3,3'-diamine-N-methyldipropylamine, tris(2-aminoethyl)amine, N,N-bis(3-aminopropyl)-1,3-propanediamine, N,N'-1,2-ethanediylbis(1,3-propanediamine), N-pyridyl-1,4-phenylenediamine,
4-aminopyridine, N-pyridyl-1,2-ethylenediamine and N-(2-ethylimidazolyl)-1,4-phenylenediamine.

Among the amines mentioned, preference is given to N-phenyl-1,4-phenylenediamine (DPA), N,N-dimethylaminopropylamine (DMAPA), particular preference being given to N-phenyl-1,4-phenylenediamine.

In a particular aspect of the present invention, the repeat units derived from amine derivatives of a polar ethylenically unsaturated monomer in the inventive polyalkyl(meth)acrylate are obtained by first preparing a polymer with reactive polar repeat units preferably derived from maleic anhydride or glycidyl (meth)acrylate. Subsequently, these reactive groups are reacted with the amines detailed above to give the polyalkyl(meth)acrylates of the present invention.

In addition, the monomer mixture for preparation of the polyalkyl(meth)acrylates for use in accordance with the invention may comprise monomers copolymerizable with the monomers detailed above. These include
aryl (meth)acrylates such as benzyl methacrylate or phenyl methacrylate, where the aryl radicals may in each case be unsubstituted or up to tetrasubstituted;
styrene monomers, for example styrene, substituted styrenes having an alkyl substituent in the side chain, for example □-methylstyrene and □-ethylstyrene, substituted styrenes having an alkyl substituent on the ring, such as vinyltoluene and p-methylstyrene, halogenated styrenes, for example monochlorostyrenes, dichlorostyrenes, tribromostyrenes and tetrabromostyrenes;

itaconic acid and itaconic acid derivatives, for example itaconic monoesters, itaconic diesters and itaconic anhydride;

fumaric acid and fumaric acid derivatives, for example fumaric monoesters, fumaric diesters and fumaric anhydride;

vinyl and isoprenyl ethers, for example alkyl vinyl ethers, especially methyl vinyl ether, ethyl vinyl ether and dodecyl vinyl ether;

vinyl esters, for example vinyl acetate;

1-alkenes, especially 1-butene, 1-pentene, 1-hexene, 1-heptene, 1-octene, 1-nonene, 1-decene, 1-undecene, 1-dodecene, 1-tridecene, 1-tetradecene and 1-pentadecene.

In a particular embodiment, it is especially possible to use dispersing monomers.

Dispersing monomers have long been used for functionalization of polymeric additives in lubricant oils and are therefore known to those skilled in the art (cf. R. M. Mortier, S. T. Orszulik (eds.): "Chemistry and Technology of Lubricants", Blackie Academic & Professional, London, $2^{nd}$ ed. 1997). It is appropriately possible to use particularly heterocyclic vinyl compounds and/or ethylenically unsaturated, polar ester or amide compounds of the formula (IV)

(IV)

in which R is hydrogen or methyl, X is oxygen, sulfur or an amino group of the formula —NH— or —NR$^a$—, in which R$^a$ is an alkyl radical having 1 to 10 and preferably 1 to 4 carbon atoms, R$^7$ is a radical which comprises 2 to 50, especially 2 to 30 and preferably 2 to 20 carbon atoms and has at least one heteroatom, preferably at least two heteroatoms, as dispersing monomers.

Examples of dispersing monomers of the formula (IV) include aminoalkyl (meth)acrylates, aminoalkyl (meth)acrylamides, hydroxylalkyl (meth)acrylates, heterocyclic (meth)acrylates and/or carbonyl-containing (meth)acrylates.

The hydroxyalkyl (meth)acrylates include 2-hydroxypropyl (meth)acrylate, 3,4-dihydroxybutyl (meth)acrylate, 2-hydroxyethyl (meth)acrylate, 3-hydroxypropyl (meth)acrylate, 2,5-dimethyl-1,6-hexanediol (meth)acrylate and 1,10-decanediol (meth)acrylate.

Carbonyl-containing (meth)acrylates comprise, for example, 2-carboxyethyl (meth)acrylate, carboxymethyl (meth)acrylate, N-(methacryloyloxy)formamide, acetonyl (meth)acrylate, mono-2-(meth)acryloyloxyethyl succinate, N-(meth)acryloylmorpholine, N-(meth)acryloyl-2-pyrrolidinone, N-(2-(meth)acryloyloxyethyl)-2-pyrrolidinone, N-(3-(meth)acryloyloxypropyl)-2-pyrrolidinone, N-(2-(meth)acryloyloxypentadecyl)-2-pyrrolidinone, N-(3-(meth)acryloyloxyheptadecyl)-2-pyrrolidinone and N-(2-(meth)acryloyloxyethyl)ethylene urea. 2-Acetoacetoxyethyl (meth)acrylate The heterocyclic (meth)acrylates include 2-(1-imidazolyl)ethyl (meth)acrylate, oxazolidinylethyl (meth)acrylate, 2-(4-morpholinyl)ethyl (meth)acrylate, 1-(2-methacryloyloxyethyl)-2-pyrrolidone, N-methacryloylmorpholine, N-methacryloyl-2-pyrrolidinone, N-(2-methacryloyloxyethyl)-2-pyrrolidinone, N-(3-methacryloyloxypropyl)-2-pyrrolidinone.

The aminoalkyl (meth)acrylates include especially N,N-dimethylaminoethyl (meth)acrylate, N,N-dimethylaminopropyl (meth)acrylate, N,N-diethylaminopentyl (meth)acrylate, N,N-dibutylaminohexadecyl (meth)acrylate.

In addition, it is possible to use aminoalkyl (meth)acrylamides as dispersing monomers, such as N,N-dimethylaminopropyl(meth)acrylamide.

In addition, it is possible to use phosphorus-, boron- and/or silicon-containing (meth)acrylates as dispersing monomers, such as 2-(dimethylphosphato)propyl (meth)acrylate, 2-(ethylenephosphito)propyl (meth)acrylate, dimethylphosphinomethyl (meth)acrylate, dimethylphosphonoethyl (meth)acrylate, diethyl (meth)acryloylphosphonate, dipropyl (meth)acryloylphosphate, 2-(dibutylphosphono) ethyl (meth)acrylate, 2,3-butylene(meth)acryloylethylborate, methyldiethoxy(meth)acryloylethoxysilane, diethylphosphatoethyl (meth)acrylate.

The preferred heterocyclic vinyl compounds include 2-vinylpyridine, 3-vinylpyridine, 4-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, N-vinylimidazole, 2-methyl-1-vinylimidazole, N-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles.

The particularly preferred dispersing monomers include especially ethylenically unsaturated compounds comprising at least one nitrogen atom, these being selected with particular preference from the above-detailed heterocyclic vinyl compounds and/or aminoalkyl (meth)acrylates, aminoalkyl (meth)acrylamides and/or heterocyclic (meth)acrylates.

In a particular embodiment, especially styrene monomers, heterocyclic monomers, vinyl ethers and/or vinyl esters are used, preference being given especially to styrene monomers.

The proportion of comonomers can be varied according to the end use and profile of properties of the polymer. In general, this proportion may be in the range from 0 to 30% by weight, preferably 0.01 to 20% by weight and more preferably 0.1 to 10% by weight. Especially the proportion of styrene monomers, heterocyclic monomers, vinyl ethers and/or vinyl esters may more preferably be in the range from 0.01 to 25% by weight, especially in the range from 0.1 to 20% by weight, more preferably in the range from 1 to 10% by weight.

The aforementioned ethylenically unsaturated monomers can be used individually or as mixtures. It is additionally possible to vary the monomer composition during the polymerization of the main chain in order to obtain defined structures, for example graft polymers.

Surprising advantages are exhibited especially by graft copolymers where the graft base comprises repeat units derived from (meth)acrylates having 6 to 22 carbon atoms in the alcohol radical, and the graft comprises repeat units derived from amine derivatives of a polar ethylenically unsaturated monomer.

Advantageously, the weight ratio of graft to graft base may be in the range from 1:2000 to 1:5, more preferably 1:1000 to 1:10 and more preferably 1:100 to 1:20.

In a preferred modification, the graft may have a very short chain, this property being determinable by comparative tests in which the graft polymerization is performed without graft base. In a particular embodiment, the number-averaged degree of polymerization of the graft may be at most 10, more preferably at most 5 and more preferably at most 3 repeat units.

Surprising advantages are exhibited especially by polyalkyl(meth)acrylates which preferably have a specific viscosity in the range from 4.5 to 50 and especially in the range from 5 to 35 ml/g, more preferably in the range from 5.5 to 25, at 100° C.

The specific viscosity is determined in an API group III base oil, which preferably has a kinematic viscosity (according to ASTM D-445) at 100° C. ($KV_{100}$) of about 5.9 mm²/s, preferably 5.7 mm²/s to 6.3 mm²/s, a viscosity index (according to ASTM D-2270) of at least 120, a pour point (according to ASTM D-97) of at most −12° C. and a density (according to ASTM D-4052) at 15° C. of about 841 (commercially available, for example, from Neste under the NEXBASE 3060 name), as a solvent at 100° C. with the aid of an Ubbelohde capillary. The size of the Ubbelohde capillary is selected such that the run times of the pure solvent and of the polymer-containing solutions are between 200 and 300 seconds. The concentration by mass β in g/ml is selected such that the run time of the polymer-containing solution does not exceed that of the pure solvent by more than 10%. The run times of the polymer-containing solution and of the solvent and the concentration by mass of the polymer in the solution can be used to calculate the specific viscosity as follows:

$$\text{specific viscosity } \eta_{sp,\beta} = \frac{\frac{\eta - \eta_L}{\eta_L}}{\beta}$$

where
$\eta$=viscosity of the solution
$\eta_L$=viscosity of the solvent
$\beta$=concentration by mass Polyalkyl(meth)acrylates of particular interest include those which preferably have a weight-average molecular weight $M_w$ in the range from 5000 to 10 000 000 g/mol, more preferably 10 000 to 1 000 000 g/mol, even more preferably 10 000 to 750 000 g/mol and most preferably 20 000 to 500 000 g/mol.

The number-average molecular weight $M_n$ may preferably be within the range from 1000 to 500 000 g/mol, more preferably 2500 to 500 000 g/mol and most preferably 5000 to 250 000 g/mol.

Additionally appropriate are polyalkyl(meth)acrylates whose polydispersity index $M_w/M_n$ is in the range from 1.1 to 5.0, more preferably in the range from 1.4 to 4.5 and most preferably in the range from 1.6 to 3.0. The number-average and weight-average molecular weight can be determined by known processes, for example gel permeation chromatography (GPC), preferably using a PMMA standard. The molecular weight of the polymer can preferably be performed prior to the derivatization thereof with an amine.

The preparation of the polyalkyl(meth)acrylates from the above-described compositions is known per se. For instance, these polymers can be obtained especially by free-radical polymerization, and also related processes, for example ATRP (=Atom Transfer Radical Polymerization) or RAFT (=Reversible Addition Fragmentation Chain Transfer).

The ATRP process is known per se. This reaction regime is described, for example, by J.-S. Wang, et al., J. Am. Chem. Soc., vol. 117, p. 5614-5615 (1995), by Matyjaszewski, Macromolecules, vol. 28, p. 7901-7910 (1995). In addition, patent applications WO 96/30421, WO 97/47661, WO 97/18247, WO 98/40415 and WO 99/10387 disclose variants of the above-described ATRP.

In addition, the inventive polymers can be obtained, for example, via RAFT methods too. This method is explained in detail, for example, in WO 98/01478 and WO 2004/083169, to which explicit reference is made for the purposes of the disclosure.

In addition, the inventive polymers are obtainable by NMP processes (nitroxide-mediated polymerization), which are described in U.S. Pat. No. 4,581,429 inter alia.

One comprehensive description, more particularly with further references, of these methods is given in K. Matyjaszewski, T. P. Davis, Handbook of Radical Polymerization, Wiley Interscience, Hoboken 2002, to which explicit reference is made for the purposes of disclosure.

The free-radical polymerization of the ethylenically unsaturated compounds can be effected in a manner known per se. Customary free-radical polymerization is described inter alia in Ullmann's Encyclopedia of Industrial Chemistry, Sixth Edition.

In the context of the present invention, the polymerization is initiated using at least one polymerization initiator for free-radical polymerization. These include the azo initiators widely known in the specialist field, such as 2,2'-azobisisobutyronitrile, 2,2'-azobis(2,4-dimethylvaleronitrile) and 1,1-azobiscyclohexanecarbonitrile, organic peroxides such as dicumyl peroxide, diacyl peroxides such as dilauroyl peroxide, peroxydicarbonates such as diisopropyl peroxydicarbonate, peresters such as tert-butyl peroxy-2-ethylhexanoate, and the like.

Polymerization initiators of very particular suitability for the purposes of the present invention include especially the following compounds:
methyl ethyl ketone peroxide, acetylacetone peroxide, dilauroyl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, 2,2'-azobisisobutyronitrile, 2,2'-azobis(2,4-dimethylvaleronitrile), 1,1-azobiscyclohexanecarbonitrile, diisopropylperoxydicarbonate, tert-amyl peroxypivalate, di(2,4-dichlorobenzoyl) peroxide, tert-butyl peroxypivalate, 2,2'-azobis(2-amidinopropane) dihydrochloride, di(3,5,5-trimethylhexanoyl) peroxide, dioctanoyl peroxide, didecanoyl peroxide, 2,2'-azobis(N,N'-dimethyleneisobutyramidine), di(2-methylbenzoyl) peroxide, dimethyl 2,2'-azobisisobutyrate, 2,2'-azobis(2-methylbutyronitrile), 2,5-dimethyl-2,5-di(2-ethylhexanoylperoxy)hexane, 4,4'-azobis (cyanopentanoic acid), di(4-methylbenzoyl) peroxide, dibenzoyl peroxide, tert-amyl peroxy-2-ethylhexanoate, tert-butyl peroxy-2-ethylhexanoate, tert-butyl peroxyisobutyrate and mixtures of the aforementioned polymerization initiators.

According to the invention, very particular preference is given to polymerization initiators having a half-life of 1 hour at a temperature in the range from 25° C. to 200° C., preferably in the range from 50° C. to 150° C., especially in the range from 50° C. to 100° C. In addition, peroxidic polymerization initiators, especially tert-butyl peroctoate, are very particularly suitable for the present purposes.

The process can be performed either in the presence or in the absence of a chain transferer. The chain transferers, also called molecular weight regulators, used may be typical species described for free-radical polymerizations, as known to those skilled in the art.

The sulfur-free molecular weight regulators include, for example, without any intention that this should impose a restriction, dimeric α-methylstyrene (2,4-diphenyl-4-methyl-1-pentene), enol ethers of aliphatic and/or cycloaliphatic aldehydes, terpenes, β-terpinene, terpinolene, 1,4-cyclohexadiene, 1,4-dihydronaphthalene, 1,4,5,8-tetrahydronaphthalene, 2,5-dihydrofuran, 2,5-dimethylfuran and/or 3,6-dihydro-2H-pyran, preference being given to dimeric α-methylstyrene.

The sulfur-containing molecular weight regulators used may preferably be mercapto compounds, dialkyl sulfides, dialkyl disulfides and/or diaryl sulfides. The following polymerization regulators are mentioned by way of example: di-n-butyl sulfide, di-n-octyl sulfide, diphenyl sulfide, thiodiglycol, ethylthioethanol, diisopropyl disulfide, di-n-butyl disulfide, di-n-hexyl disulfide, diacetyl disulfide, diethanol sulfide, di-t-butyl trisulfide and dimethyl sulfoxide. Compounds used with preference as molecular weight regulators are mercapto compounds, dialkyl sulfides, dialkyl disulfides and/or diaryl sulfides.

Examples of these compounds are ethyl thioglycolate, 2-ethylhexyl thioglycolate, pentaerythritol tetrathioglycolate, cysteine, 2-mercaptoethanol, 1,3-mercapto-propanol, 3-mercaptopropane-1,2-diol, 1,4-mercaptobutanol, mercaptoacetic acid, 3-mercaptopropionic acid, thioglycolic acid, mercaptosuccinic acid, thioglycerol, thioacetic acid, thiourea and alkyl mercaptans such as n-butyl mercaptan, n-hexyl mercaptan, t-dodecyl mercaptan or n-dodecyl mercaptan. Polymerization regulators used with particular preference are mercapto alcohols and mercapto carboxylic acids. In the context of the present invention, very particular preference is given to the use of n-dodecyl mercaptan and tert-dodecyl mercaptan as chain transferers.

The repeat units derived from amine derivatives of a polar ethylenically unsaturated monomer in the polyalkyl(meth)acrylate are preferably obtained by a polymer-analogous reaction after the above-described preparation of a polyalkyl (meth)acrylate. Accordingly, it is possible with preference first to prepare a polymer with reactive polar units, the reactive units being reacted with an amine of the type described above. The reactive polar units include especially anhydride or epoxide units.

The reaction of the reactive polar units present in the polymer, preferably of the anhydride or epoxide groups, with amines can be effected typically between 40° C. and 180° C., preferably between 80° C. and 180° C. and more preferably between 100° C. and 160° C. The amine can preferably be added in an equimolar amount to the reactive polar groups, preferably to the anhydride or epoxide groups. If excess amounts of amine are added, it can subsequently be removed from the mixture. In the case of excessively small proportions, reactive groups remain, which can optionally be converted to less reactive groups by addition of small amounts of water.

The amine can be added in pure form or be added to the reaction mixture in a suitable solvent. Preference is given to polar solvents, especially esters, e.g. butyl acetate or diisononyl adipate (Plastomoll DNA).

According to the nature of the reactive reactant group converted, water may be formed. For example, in the case of use of anhydride groups, water is released, which, in a particular aspect of the present invention, can be removed substantially completely from the reaction mixture, it being possible to drive out water, for example, by means of dry nitrogen. In addition, it is possible to use desiccants. Volatile solvents such as butyl acetate, if used, can be distilled off after the reaction, preferably under reduced pressure.

The inventive polymers are preferably used to improve lubricant oil properties. The lubricant oils include especially mineral oils, synthetic oils and natural oils.

Mineral oils are known per se and commercially available. They are generally obtained from mineral oil or crude oil by distillation and/or refining and optionally further purification and finishing processes, the term mineral oil including in particular the higher-boiling fractions of crude or mineral oil. In general, the boiling point of mineral oil is higher than 200° C., preferably higher than 300° C., at 5000 Pa. The production by low-temperature carbonization of shale oil, coking of bituminous coal, distillation of brown coal with exclusion of air, and also hydrogenation of bituminous or brown coal is likewise possible. Accordingly, mineral oils have, depending on their origin, different proportions of aromatic, cyclic, branched and linear hydrocarbons.

In general, a distinction is drawn between paraffin-base, naphthenic and aromatic fractions in crude oils or mineral oils, in which the term paraffin-base fraction represents longer-chain or highly branched isoalkanes, and naphthenic fraction represents cycloalkanes. In addition, mineral oils, depending on their origin and finishing, have different fractions of n-alkanes, isoalkanes having a low degree of branching, known as mono-methyl-branched paraffins, and compounds having heteroatoms, in particular O, N and/or S, to which a degree of polar properties are attributed. However, the assignment is difficult, since individual alkane molecules may have both long-chain branched groups and cycloalkane radicals, and aromatic parts. For the purposes of the present invention, the assignment can be effected according to DIN 51 378, for example. Polar fractions can also be determined according to ASTM D 2007.

The proportion of n-alkanes in preferred mineral oils is less than 3% by weight, the fraction of O-, N- and/or S-containing compounds less than 6% by weight. The fraction of the aromatics and of the mono-methyl-branched paraffins is generally in each case in the range from 0 to 40% by weight. In one interesting aspect, mineral oil comprises mainly naphthenic and paraffin-base alkanes which have generally more than 13, preferably more than 18 and most preferably more than 20 carbon atoms. The fraction of these compounds is generally 60% by weight, preferably 80% by weight, without any intention that this should impose a restriction. A preferred mineral oil contains 0.5 to 30% by weight of aromatic fractions, 15 to 40% by weight of naphthenic fractions, 35 to 80% by weight of paraffin-base fractions, up to 3% by weight of n-alkanes and 0.05 to 5% by weight of polar compounds, based in each case on the total weight of the mineral oil.

An analysis of particularly preferred mineral oils, which was effected by means of conventional processes such as urea separation and liquid chromatography on silica gel, shows, for example, the following constituents, the percentages relating to the total weight of the particular mineral oil used:

n-alkanes having approx. 18 to 31 carbon atoms: 0.7-1.0%,
slightly branched alkanes having 18 to 31 carbon atoms: 1.0-8.0%, aromatics having 14 to 32 carbon atoms:
0.4-10.7%,
iso- and cycloalkanes having 20 to 32 carbon atoms:
60.7-82.4%,
polar compounds:
0.1-0.8%,
loss:
6.9-19.4%.

An improved class of mineral oils (reduced sulfur content, reduced nitrogen content, higher viscosity index, lower pour point) results from hydrogen treatment of the mineral oils (hydroisomerization, hydrocracking, hydrotreatment, hydrofinishing). In the presence of hydrogen, this essentially reduces aromatic components and builds up naphthenic components.

Valuable information with regard to the analysis of mineral oils and a list of mineral oils which have a different composition can be found, for example, in T. Mang, W. Dresel (eds.): "Lubricants and Lubrication", Wiley-VCH, Weinheim 2001; R. M. Mortier, S. T. Orszulik (eds.): "Chemistry and Technology of Lubricants", Blackie Academic & Professional, London, 2$^{nd}$ ed. 1997; or J. Bartz: "Additive für Schmierstoffe", Expert-Verlag, Renningen-Malmsheim 1994.

Synthetic oils include organic esters, for example diesters and polyesters, polyalkylene glycols, polyethers, synthetic hydrocarbons, especially polyolefins, among which preference is given to polyalphaolefins (PAOs), silicone oils and perfluoroalkyl ethers. In addition, it is possible to use synthetic base oils originating from gas to liquid (GTL), coal to liquid (CTL) or biomass to liquid (BTL) processes. They are usually somewhat more expensive than the mineral oils, but have advantages with regard to their performance.

Natural oils are animal or vegetable oils, for example neatsfoot oils or jojoba oils.

Base oils for lubricant oil formulations are divided into groups according to API (American Petroleum Institute). Mineral oils are divided into group I (non-hydrogen-treated) and, depending on the degree of saturation, sulfur content and viscosity index, into groups II and III (both hydrogen-treated). PAOs correspond to group IV. All other base oils are encompassed in group V.

These lubricant oils may also be used as mixtures and are in many cases commercially available.

The concentration of the inventive polyalkyl(meth)acrylate in the lubricant oil composition is preferably in the range of 0.01 to 30% by weight, more preferably in the range of 0.1-20% by weight and most preferably in the range of 0.5-15% by weight, based on the total weight of the composition.

In addition to the polymers comprising ester groups for use in accordance with the invention, the lubricant oil compositions detailed here may also comprise further additives. These additives include VI improvers, pour point improvers and DI additives (dispersants, detergents, defoamers, corrosion inhibitors, antioxidants, antiwear and extreme pressure additives, friction modifiers).

The additionally usable VI improvers include especially polyalkyl(meth)acrylates having 1 to 30 carbon atoms in the alcohol group (PAMAs; partly N/O-functional with advantageous additional properties as dispersants, antiwear additives and/or friction modifiers), which differ from the copolymers detailed in claim 1, and poly(iso)butenes (PIB), fumarate-olefin copolymers, styrene-maleate copolymers, hydrogenated styrene-diene copolymers (HSD) and olefin copolymers (OCP).

The pour point improvers include especially polyalkyl (meth)acrylates (PAMAs) having 1 to 30 carbon atoms in the alcohol group.

Compilations of VI improvers and pour point improvers for lubricant oils are also detailed in T. Mang, W. Dresel (eds.): "Lubricants and Lubrication", Wiley-VCH, Weinheim 2001; R. M. Mortier, S. T. Orszulik (eds.): "Chemistry and Technology of Lubricants", Blackie Academic & Professional, London, 2nd ed. 1997; or J. Bartz: "Additive für Schmierstoffe", Expert-Verlag, Renningen-Malmsheim 1994.

Appropriate dispersants include poly(isobutylene) derivatives, e.g. poly(isobutylene)succinimides (PIBSIs); ethylene-propylene oligomers with N/O functionalities.

The preferred detergents include metal-containing compounds, for example phenoxides; salicylates; thiophosphonates, especially thiopyrophosphonates, thiophosphonates and phosphonates; sulfonates and carbonates. As metals, these compounds may comprise especially calcium, magnesium and barium. These compounds may be used preferably in neutral or overbased form.

Of particular interest are additionally defoamers, which are in many cases divided into silicone-containing and silicone-free defoamers. The silicone-containing defoamers include linear poly(dimethylsiloxane) and cyclic poly(dimethylsiloxane). The silicone-free defoamers which may be used are in many cases polyethers, for example poly(ethylene glycol) or tributyl phosphate.

In a particular configuration, the inventive lubricant oil compositions may comprise corrosion inhibitors. These are in many cases divided into antirust additives and metal passivators/deactivators. The antirust additives used may, inter alia, be sulfonates, for example petroleumsulfonates or (in many cases overbased) synthetic alkylbenzenesulfonates, e.g. dinonylnaphthenesulfonate; carboxylic acid derivatives, for example lanolin (wool fat), oxidized paraffins, zinc naphthenates, alkylated succinic acids, 4-nonylphenoxyacetic acid, amides and imides (N-acylsarcosine, imidazoline derivatives); amine-neutralized mono- and dialkyl phosphates; morpholine; dicyclohexylamine or diethanolamine. The metal passivators/deactivators include benzotriazole, tolyltriazole, 2-mercaptobenzothiazole, dialkyl-2,5-dimercapto-1,3,4-thiadiazole; N,N'-disalicylideneethylenediamine, N,N'-disalicyli-denepropylenediamine; zinc dialkyldithiophosphates and dialkyldithiocarbamates.

A further preferred group of additives is that of antioxidants. The antioxidants include, for example, phenols, for example 2,6-di-tert-butylphenol (2,6-DTB), butylated hydroxytoluene (BHT), 2,6-di-tert-butyl-4-methylphenol, 4,4'-methylenebis(2,6-di-tert-butylphenol); aromatic amines, especially alkylated diphenylamines, N-phenyl-1-naphthylamine (PNA), polymeric 2,2,4-trimethyldihydroquinone (TMQ); compounds containing sulfur and phosphorus, for example metal dithiophosphates, e.g. zinc dithiophosphates (ZnDTP), "OOS triesters"=reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylenebis(dialkyldithiocarbamate); organophosphorus compounds, for example triaryl and trialkyl phosphites; organocopper compounds and overbased calcium- and magnesium-based phenoxides and salicylates.

The preferred antiwear (AW) and extreme pressure (EP) additives include phosphorus compounds, for example trialkyl phosphates, triaryl phosphates, e.g. tricresyl phosphate, amine-neutralized mono- and dialkyl phosphates, ethoxylated mono- and dialkyl phosphates, phosphites, phosphonates, phosphines; compounds containing sulfur and phosphorus, for example metal dithiophosphates, e.g. zinc $C_{3-12}$dialkyldithiophosphates (ZnDTPs), ammonium dialkyldithiophosphates, antimony dialkyldithiophosphates, molybdenum dialkyldithiophosphates, lead dialkyldithiophosphates, "OOS triesters"=reaction products of dithiophosphoric acid with activated double bonds from olefins, cyclopentadiene, norbornadiene, □-pinene, polybutene, acrylic esters, maleic esters, triphenylphosphorothionate (TPPT); compounds containing sulfur and nitrogen, for example zinc bis(amyl dithiocarbamate) or methylenebis(di-n-butyl dithiocarbamate); sulfur compounds containing elemental sulfur and $H_2S$-sulfurized hydrocarbons (diisobutylene, terpene); sulfurized glycerides and fatty acid esters; overbased sulfonates; chlorine compounds or solids such as graphite or molybdenum disulfide.

A further preferred group of additives is that of friction modifiers. The friction modifiers used may include mechanically active compounds, for example molybdenum disulfide, graphite (including fluorinated graphite), poly(trifluoroethylene), polyamide, polyimide; compounds which form adsorption layers, for example long-chain carboxylic acids, fatty acid esters, ethers, alcohols, amines, amides, imides; compounds which form layers through tribochemical reactions, for example saturated fatty acids, phosphoric acid and thiophosphoric esters, xanthogenates, sulfurized fatty acids; compounds which form polymer-like layers, for example ethoxylated dicarboxylic acid partial esters, dialkyl phthalates, methacrylates, unsaturated fatty acids, sulfurized olefins or organometallic compounds, for example molybdenum compounds (molybdenum dithiophosphates and molybdenum dithiocarbamates MoDTC) and their combinations with ZnDTPs, copper-containing organic compounds.

Some of the additives detailed above may fulfill multiple functions. ZnDTP, for example, is primarily an antiwear additive and extreme pressure additive, but also has the character of an antioxidant and corrosion inhibitor (here: metal passivator/deactivator).

The additives detailed above are described in more detail, inter alia, in T. Mang, W. Dresel (eds.): "Lubricants and Lubrication", Wiley-VCH, Weinheim 2001; J. Bartz: "Additive für Schmierstoffe", Expert-Verlag, Renningen-Malmsheim 1994; R. M. Mortier, S. T. Orszulik (eds.): "Chemistry and Technology of Lubricants", Blackie Academic & Professional, London, $2^{nd}$ ed. 1997.

Preferred lubricant oil compositions have a viscosity, measured at 40° C. according to ASTM D 445, in the range of 10 to 120 mm$^2$/s, more preferably in the range of 15 to 100 mm$^2$/s. The kinematic viscosity $KV_{100}$ measured at 100° C. is preferably at least 2.0 mm$^2$/s, more preferably at least 3.5 mm$^2$/s and most preferably at least 4.0 mm$^2$/s.

In a particular aspect of the present invention, preferred lubricant oil compositions have a viscosity index determined according to ASTM D 2270 in the range of 100 to 500, more preferably in the range of 125 to 400 and most preferably in the range of 150 to 350.

In a particular aspect of the present invention, the values mentioned can surprisingly be achieved by using predominantly the inventive polyalkyl(meth)acrylates to improve the viscosity index. In a preferred configuration, therefore, preferably at least 20% by weight, more preferably at least 40% by weight and especially preferably at least 60% by weight of the compounds used to improve the viscosity index may be inventive polyalkyl(meth)acrylates.

Further lubricant oil compositions of particular interest are those which have a high-shear viscosity HTHS measured at 150° C. of at least 1.6 mPas, more preferably at least 2.0 mPas. The high-shear viscosity HTHS measured at 100° C. is preferably at most 10 mPas, more preferably at most 7 mPas and most preferably at most 5 mPas. The difference in the high-shear viscosities HTHS which are measured at 100° C. and 150° C., $HTHS_{100}-HTHS_{150}$, is preferably at most 4 mPas, more preferably at most 3.3 mPas and most preferably at most 2.5 mPas. The ratio of high-shear viscosity at 100° C. $HTHS_{100}$ to high-shear viscosity at 150° C. $HTHS_{150}$, $HTHS_{100}/HTHS_{150}$, is preferably at most 2.0, more preferably at most 1.9. The high-shear viscosity HTHS can be measured according to ASTM D4683 at the respective temperature.

In an appropriate modification, the permanent shear stability index (PSSI) according to ASTM D2603 Ref. B (ultrasound treatment for 12.5 minutes) may be less than or equal to 50, more preferably less than or equal to 35. Advantageously, it is also possible to obtain lubricant oil compositions which have a permanent shear stability index (PSSI) according to DIN 51381 (30 cycles of a Bosch pump) of at most 35, preferably at most 25 and most preferably at most 5.

Wear can be determined, for example, on a four-ball apparatus (VKA) standardized according to DIN 51350-3 or DIN 51350-5, in which a rotating ball is pressed under load onto three identical fixed balls. By visual measurement of the spherical caps formed, the wear is determined. The mean is formed for the individually measured spherical cap diameters and for each load stage (150 N and 300 N). The end result reported is the sum of the two mean values, resulting from the mean spherical cap diameter at 150 N and 300 N. The measurement is preferably commenced at room temperature; after the test has ended, the temperature is typically not more than 60° C. This test is referred to hereinafter as VKA test.

Preferred lubricant oils of the present invention achieve, at a load of 300 N, abrasion values (=mean spherical cap diameter), according to the average values detailed in the examples, of at most 0.3 mm, preferably at most 0.1 mm and more preferably at most 0.05 mm.

The present lubricants can be used especially as a transmission oil, motor oil or hydraulic oil. Surprising advantages can be achieved especially when the present lubricants are used in manual, automated manual, double clutch or direct-shift gearboxes (DSGs), automatic and continuous variable transmissions (CVCs). In addition, the present lubricants can be used especially in transfer cases and axle or differential gearings.

The present invention will be illustrated in detail hereinafter with reference to examples and comparative examples, without any intention that this should impose a restriction.

EXAMPLES AND COMPARATIVE EXAMPLES

Methods

Determination of the Coefficient of Friction

For measurements of the coefficient of friction, all polymers were diluted in Nexbase 3060 (an API group III base oil) to 3.5 mPas in HTHS150 according to ASTM D 4683.

The coefficient of friction measurements were conducted on a mini traction machine from PCS Instruments under the following conditions:

| | |
|---|---|
| Test Rig | MTM 2 from PCS Instruments |
| Disk | Steel, AISI 52100, diameter = 46 mm RMS = 25-30 nm, Rockwell C hardness = 63 Elastic modulus = 207 GPa |
| Ball | Steel, AISI 52100, diameter = 19.05 mm RMS = 10-13 nm, Rockwell C hardness = 58-65 Elastic modulus = 207 GPa |
| Speed | 5-2500 mm/s |
| Temperature | 100° C. |
| Load | 30N = max. Hertzian contact pressure 0.95 GPa. |
| Slide/roll ratio | 50% |

Figure 1:
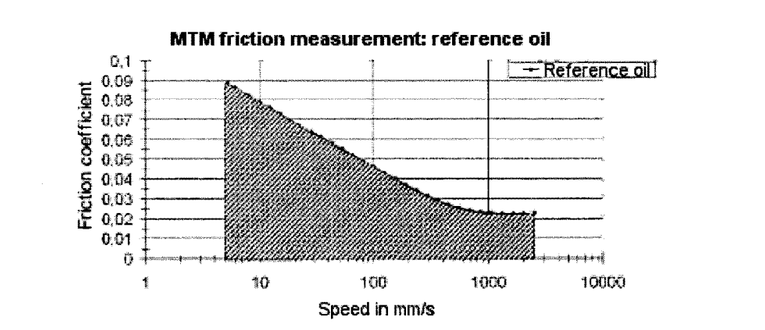

For evaluation, the area (integral) below the coefficient of friction curve determined for the candidate is expressed as a ratio to the area for the reference oil. The reference oil used is an API group III oil without addition of film-forming polymers and having an HTHS150 of 3.50 mPas. For the reference oil, the area was 64.5 mm*s$^{-1}$ at 100° C.; see hatched area in FIG. 1. At 120° C., the area for the reference oil was only 45.96 mm*s$^{-1}$.

After determining the areas for the candidate oils, the reduction in the coefficient of friction can be calculated as follows:

$$\text{Reduction in friction (total)} = \frac{\int_5^{2500} \text{friction values\_reference oil} - \int_5^{2500} \text{friction values\_candidate oil}}{\int_5^{2500} \text{friction values\_reference oil}} * 100\%$$

At high sliding speeds, the coefficient of friction is typically very small since the high speed results in a large amount of oil being introduced from the areas of friction into the lubrication gap. With decreasing sliding speed, less and less oil is introduced into the lubrication gap, and the coefficients of friction rise. It is of particular interest to lower the coefficients of friction, especially also at low sliding speeds. Therefore, not only is the reduction in friction based on the overall speed range (5-2500 mm/s) of interest, but also the reduction in friction at low sliding speeds (2-200 mm/s). The reduction in friction at low speeds is accordingly calculated as follows:

$$\text{Reduction in friction (low speed)} = \frac{\int_5^{200} \text{friction values\_reference oil} - \int_5^{200} \text{friction values\_candidate oil}}{\int_5^{200} \text{friction values\_reference oil}} * 100\%$$

Wear Test on the 4-Ball Apparatus:

The Shell four-ball apparatus (VKA) is a test instrument standardized in DIN 51 350 Part 1 for determination of the weld load and good load (DIN 51 350 Parts 2 and 3) and various friction and wear characteristics of lubricants (DIN 51 350 Parts 3 and 5). In the standard test, a rotating ball-bearing ball is pressed under load onto three identical but stationary balls. The test system is widespread in the lubricants industry in particular and is used routinely therein for product development and quality control.

Wear is determined by visual measurement of the spherical caps formed. The mean is formed for the individually measured spherical cap diameters and for each load stage (150 N and 300 N). The end result reported is the sum of the two mean values, resulting from the mean spherical cap diameter at 150 N and 300 N.

Polymer Characterization:

To characterize the polymers, the specific viscosity was determined in an API group III base oil from Neste (NEXBASE 3060) at a fixed polymer concentration. The values determined are reported in the table shown below in ml/g.

Polymer Synthesis

General Synthesis Method of the Inventive Examples:

The general synthesis method which follows was followed for all inventive polymers; the exact polymer composition, polymerization temperature and initiator content can be found in table 1.

The monomers of the base polymer specified in table 1 were used to make up a mixture. All of the polymerization oil (=solvent in the polymerization) is initially charged in the reaction flask, which was equipped with internal temperature regulation, stirrer, nitrogen inlet and condenser. A sufficient amount of the monomer mixture was added to the initial charge in the reaction flask that oil and monomer mixture were present in a ratio of 9:1. Subsequently, while stirring and introducing nitrogen, the mixture was heated to reaction temperature. On attainment of the reaction temperature, the specified amount of initiator was fed in and the monomer feed was started.

In some examples, a regulator (n-dodecyl mercaptan, nDDM) was used, which was added in the specified amount to the monomer mixture (only base polymer).

The monomer feed consisted of the remaining monomer mixture with the specified amount of initiator in the feed. The feed was effected homogeneously over 3.5 hours. 2 hours after the feed had ended, another 0.2% initiator was optionally fed in at the specified reaction temperature.

The mixture was kept at reaction temperature until at least 5 half-lives of the initiator had elapsed.

In the case of performance of a graft polymerization, this was followed by heating to 130° C., addition of the specified amount of graft monomer and initiation of the graft reaction with 0.25% tert-butyl perbenzoate (tBPB). The amount of tBPB is based on the amount of base polymer plus the added graft monomer. 1 and 2 hours after commencement of the graft reaction, another 0.125% tBPB is fed in. After the last addition of initiator, the mixture is stirred at 130° C. for at least another 3 hours. The polymerizations of examples 1 to 9 shown in table 1 were graft polymerizations, the information in the square brackets describing the composition of the graft base.

TABLE 1

Details of the preparation of the polymers used

| | Composition of the polymer [% by wt.] | Solids content* [%] | Initiator | nDDM [%] | Polymerization temperature [° C.] |
|---|---|---|---|---|---|
| Example 1 | [pLMA-co-Sty-MMA]-g-MA 86.3-9.7-1-3 | 70 | tBPO 0.27% | 0.10 | 100 |
| Example 2 | [pLMA-co-EHMA]-g-MA 68.4-30.1-1.5 | 70 | tBPO 0.20% | 0.05 | 110 |
| Example 3 | [pLMA-co-MMA]-g-MA 87.3-9.7-3 | 70 | tBPO 0.24% | 0.19 | 110 |
| Example 4 | [pLMA-co-MMA-Sty]-g-MA 86.3-9.7-1-3 | 55 | tBPO 0.35% | — | 90 |
| Example 5 | [pLMA-DPMA-SMA-MMA]-g-MA 86.9-0.2-0.2-9.7-3 | 75 | tBPO 3.7% | 0.30 | 110 |
| Example 6 | [pLMA-co-MMA-Sty-MA]-g-NVP 80.7-8.2-0.9-0.9-9.3 | 55 | tBPO 0.30% | — | 90 |
| Example 7 | [pLMA-co-MMA-Sty-MA]-g-MA 94.1-1-1-1-2.9 | 70 | tBPO 0.30% | — | 100 |
| Example 8 | [pLMA-co-MMA-Sty-NVP]-g-MA 94.1-1-1-1-2.9 | 70 | tBPO 0.30% | — | 100 |
| Example 9 | [pLMA-co-MMA-hPBDMA]-g-MA 72-15-10-3 | 70 | tBPO 0.20% | — | 100 |
| Example 10 | pLMA-co-GLMA 95.9-4.1 | 70 | tBPO 0.25% | 0.90 | 100 |
| Example 11 | pLMA-co-MMA-Sty-MA 87-6-6-1 | 50 | tBPO 0.5% | — | 100 |
| Example 12 | pLMA-co-Sty-MA 87-6-1 | 50 | tBPO 0.5% | — | 100 |
| Example 13 | pLMA-co-MMA-MA 87-12-1 | 50 | tBPO 0.5% | — | 100 |

*after polymerization

The monomers used were abbreviated as follows:
DPMA: alkyl methacrylate having 12 to 15 carbon atoms in the alkyl radical
EHMA: ethylhexyl methacrylate
GLMA: glycidyl methacrylate
LMA: alkyl methacrylate having 12 to 14 carbon atoms in the alkyl radical
MMA: methyl methacrylate
MSA: maleic anhydride
NVP: N-vinylpyrrolidone
SMA: alkyl methacrylate having 16 to 18 carbon atoms in the alkyl radical
Sty: styrene
hPBDMA: macromonomer: methacrylate of a hydrogenated polybutadiene The resulting polymers were derivatized with an amine in a polymer-analogous reaction. The maleic anhydride (MA) or glycidyl methacrylate present in the polymers was reacted with the amines, N-phenyl-1,4-phenylenediamine (DPA) or N,N-dimethylaminopropylamine (DMAPA), listed in table 2 at about 140° C. The amine was added in equimolar amounts to MA or GLMA. The amine was either added in pure form or diluted in a suitable solvent. Preferred examples are butyl acetate or Plastomoll DNA. Any water formed was driven out by blowing in dry nitrogen. Volatile solvents such as butyl acetate, if any are used, have to be distilled off again under reduced pressure after the reaction. The inventive, fully converted polymers were diluted to the polymer content specified after the end of the reaction and optionally pressure-filtered through a depth filter layer. The amines used and the compositions obtained are shown in table 2.

TABLE 2

| | Amine | Polymer content in end product [%] | $\eta sp/c$ 100° C. in NB 3060 |
|---|---|---|---|
| Example 1 | DPA | 58.4 | 22.28 mL/g |
| Example 2 | DMAPA | 60 | 24.88 mL/g |
| Example 3 | DPA | 58.6 | 21.12 mL/g |
| Example 4 | DPA | 50.6 | 23.40 mL/g |
| Example 5 | DPA | 62.1 | 6.29 mL/g |
| Example 6 | DMAPA | 40 | not determined |
| Example 7 | DPA | 50 | not determined |
| Example 8 | DPA | 50 | not determined |
| Example 9 | DPA | 45 | 28.98 |
| Example 10 | DPA | 50 | 10.29 |
| Example 11 | DPA | 48.6 | 14.48 |
| Example 12 | DPA | 48.6 | 16.19 |
| Example 13 | DPA | 48.6 | 15.61 |

The above-detailed polymers of examples 1 to 5 which have been reacted with the amines according to table 2 were analyzed by the above methods. In addition, the viscosity index of lubricant oil compositions was determined, these data being described in table 3. The resulting values in relation to the improvement in coefficient of friction are shown in table 4. The measurements reported under reference relate to the base oil used.

TABLE 3

Viscosity data

| | Formulation | KV40° C. [mm²/s] | KV100° C. [mm²/s] | VI |
|---|---|---|---|---|
| Example 1 | 8.0% in Nexbase 3060 | 66.42 | 13.20 | 205 |
| Example 2 | 7.65% in Nexbase 3060 | 68.80 | 13.01 | 193 |
| Example 3 | 8.6% in Nexbase 3060 | 67.80 | 13.34 | 203 |
| Example 4 | 8.15% in Nexbase 3060 | 44.08 | 9.86 | 203 |
| Example 5 | 20.7% in Nexbase 3060 | 67.12 | 11.48 | 166 |
| Example 7 | 9.6% in RMF 5/2 (150N oil) | 95.06 | 16.39 | 186 |
| Example 8 | 9.6% in RMF 5/2 (150N oil) | 111.1 | 18.68 | 189 |
| Example 9 | 10.67% in RMF 5/2 (150N oil) | 101.7 | 20.39 | 226 |
| Example 10 | 13.5% in Nexbase 3060 | 60.57 | 11.57 | 189 |
| Example 11 | 11.8% in Nexbase 3060 | 57.59 | 11.13 | 190 |
| Example 12 | 10.6% in Nexbase 3060 | 58.58 | 11.07 | 185 |
| Example 13 | 11% in Nexbase 3060 | 55.31 | 11.12 | 199 |

Nexbase 3060 is a commercially available group III oil
RMF 5/2 is a commercial 150N oil In addition, the inventive lubricants exhibit an excellent high-shear viscosity HTHS measured at 150° C., with values determined for some examples in the range from 3.19 (example 12) to 3.83 (example 5).

TABLE 4

Coefficients of friction

| | Total area | Low-speed area | Improvement in friction Total in % | Improvement in friction Low speed in % |
|---|---|---|---|---|
| Reference | 64.51 | 9.25 | 0.0 | 0.0 |
| Example 1 | 53.83 | 5.02 | 16.6 | 45.7 |
| Example 2 | 61.40 | 6.91 | 4.8 | 25.3 |
| Example 3 | 54.58 | 5.47 | 15.4 | 40.9 |
| Example 4 | 52.29 | 4.92 | 18.9 | 46.8 |
| Example 5 | 55.07 | 5.16 | 14.6 | 44.2 |

The results in table 4 show clearly that the inventive polymers lead to a distinct decrease in the coefficients of friction. Particularly in the region of the low sliding speeds, which often occur in real applications and are therefore of particular interest, reductions in the coefficient of friction of more than 50% are achievable.

The results also show that styrene-containing polymers exhibit better friction characteristics than the corresponding styrene-free products. Even small amounts of styrene of, for example, 1% show a distinct effect; compare example 4 (1% styrene) with examples 2 and 3 (no styrene).

In addition, the compatibility of the inventive polymers with commercial PIB succinimides (Infineum C9201) was studied.

For this purpose, 1% by weight (active substance) of a commercial PIB succinimide (Infineum C9201) was added. The coefficient of friction measurements were conducted and evaluated as described above, but the measurement temperature was 120° C. The results of the evaluation are summarized in table 5.

TABLE 5

Coefficients of friction with and without addition of PIB succinimide

| | Total area without PIBSI | Low-speed area without PIBSI | Total area with PIBSI | Low-speed area with PIBSI |
|---|---|---|---|---|
| Reference | 45.96 | 8.43 | 45.96 | 8.43 |
| Example 5 | 41.75 | 6.06 | 42.62 | 5.98 |

The results show that the present copolymer essentially retains the excellent improvement in coefficient of friction, even in the case of addition of PIBSI, and a slight improvement therein can be measured in the low-speed range.

In addition, the wear characteristics were determined in a fully formulated oil with addition of a commercially available ashless antiwear package. In this case, the inventive polymer according to example 1 was diluted to a KV100 of 9.50 mm²/s in a mixture of APE Core 80N:APE Core 150N=70:30. The oil contained about 0.90% by weight of the ashless antiwear package mentioned. The results of the wear test are shown in table 6. If a spherical cap diameter of 0.00 mm is reported as the result, no spherical cap was visible on the ball (=no wear, only negligible, unmeasurable plastic deformation). The oil was determined twice for each load stage:

TABLE 6

Wear data

| | Polymer according to example 1 | |
|---|---|---|
| Load | 150N | 300N |
| Ball 1 | 0.00/0.00 | 0.10/0.10 |
| Ball 2 | 0.00/0.00 | 0.00/0.00 |
| Ball 3 | 0.00/0.00 | 0.00/0.00 |
| Ball 4 | 0.00/0.00 | 0.00/0.00 |
| Ball 5 | 0.00/0.00 | 0.00/0.00 |
| Ball 6 | 0.00/0.00 | 0.00/0.00 |
| Average | 0.00/0.00 | 0.017/0.017 |
| Result | 0.00 | 0.034 |
| Sum | 0.03 mm | |

The invention claimed is:

1. A polyalkyl(meth)acrylate being a graft copolymer, wherein:
a graft base of the graft copolymer comprises:
a) from 0 to 40% by weight of a repeat unit derived from a (meth)acrylate of formula (I)

(I)

b) from 20 to 99.9% by weight of a repeat unit derived from a (meth)acrylate of formula (II)

(II)

and
c) from 0 to 20% by weight of a repeat unit derived from a (meth)acrylate of formula (III)

(III)

wherein each R is independently hydrogen or methyl,
R¹ is an alkyl radical having from 1 to 5 carbon atoms,
R² is an alkyl radical having from 6 to 22 carbon atoms, and
R³ is an alkyl radical having from 23 to 4000 carbon atoms, and
a graft of the graft copolymer comprises
d) from 0.1 to 10% by weight of a repeat unit derived from an amine derivative of a polar ethylenically unsaturated monomer,
wherein the polar ethylenically unsaturated monomer is maleic acid anhydride and the amine derivative is derived from N-phenyl-1,4-phenylenediamine.

2. The polyalkyl(meth)acrylate of claim 1,
wherein the polyalkyl(meth)acrylate has a specific viscosity in the range from 5 to 35 ml/g at 100° C.

3. The polyalkyl(meth)acrylate of claim 1, comprising:
a repeat unit derived from a styrene monomer.

4. The polyalkyl(meth)acrylate of claim 3,
wherein the polyalkyl(meth)acrylate comprises 0.1 to 20% by weight of the repeat unit derived from a styrene monomer.

5. The polyalkyl(meth)acrylate of claim 1, comprising:
a) from 0 to 40% by weight of a repeat unit derived from a (meth)acrylate of formula (I)

(I)

b) from 50 to 999% by weight of a repeat unit derived from a (meth)acrylate of formula (II)

(II)

c) from 0.5 to 20% by weight of a repeat unit derived from a (meth)acrylate of formula (III)

(III)

and
d) from 0.1 to 10% by weight of a repeat unit derived from an amine derivative of a polar ethylenically unsaturated monomer, wherein each R is independently hydrogen or methyl,
$R^1$ is an alkyl radical having from 1 to 5 carbon atoms,
$R^2$ is an alkyl radical having from 6 to 22 carbon atoms, and
$R^3$ is an alkyl radical having from 23 to 4000 carbon atoms.

6. A process for preparing the polyalkyl(meth)acrylate of claim 1, the process comprising:
preparing the graft base: subsequently
grafting the polar ethylenically unsaturated monomer onto the graft base, and then reacting the resulting polymer with an amine.

7. The process of claim 6, wherein the polymerizing comprises:
preparing a graft base by polymerizing the (meth)acrylate having from 6 to 22 carbon atoms, and subsequently
grafting the polar ethylenically unsaturated monomer onto the graft base.

8. A lubricant composition comprising the polyalkyl(meth)acrylate of claim 1.

9. The lubricant composition of claim 8, comprising from 0.01 to 30% by weight of the polyalkyl(meth)acrylate.

10. A method of reducing friction, comprising:
applying the composition of claim 8 to a composition or apparatus in need thereof.

11. The polyalkyl(meth)acrylate of claim 1, wherein the repeat unit derived from the (meth)acrylate of formula (III) comprises a polyolefin-based repeat unit having a number-average molecular weight of from 500 to 50,000 g/mol.

12. The polyalkyl(meth)acrylate of claim 5, wherein the repeat unit derived from the (meth)acrylate of formula (III) comprises a polyolefin-based repeat unit having a number-average molecular weight of from 500 to 50,000 g/mol.

* * * * *